W. A. HOFFMAN.
CALIPERS.
APPLICATION FILED JAN. 21, 1921.

1,402,497.

Patented Jan. 3, 1922.

Inventor:
Walter A. Hoffman,
By Frederick V. Winters,
Attorney

W. A. HOFFMAN.
CALIPERS.
APPLICATION FILED JAN. 21, 1921.
1,402,497.
Patented Jan. 3, 1922.
2 SHEETS—SHEET 2.
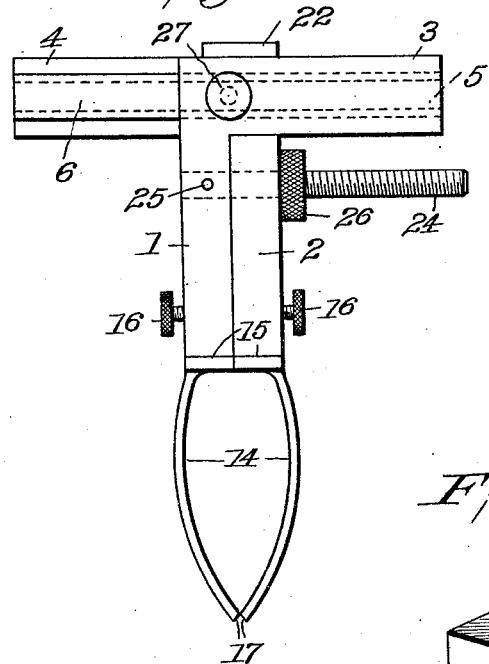
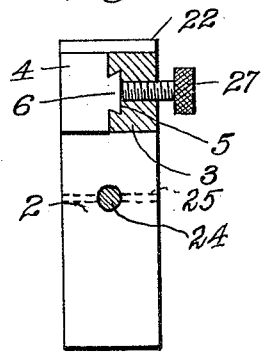
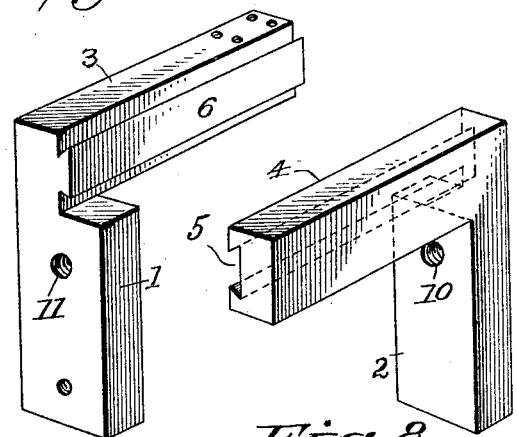
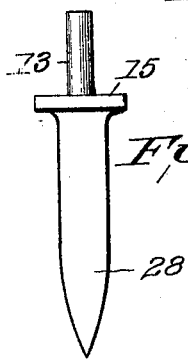
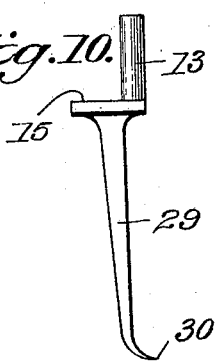
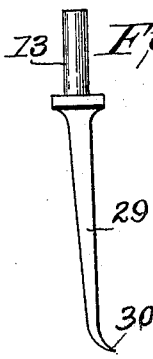
Inventor.
Walter A. Hoffman,
By Frederick V. Winters
Attorney.

UNITED STATES PATENT OFFICE.

WALTER A. HOFFMAN, OF NEW YORK, N. Y.

CALIPERS.

1,402,497.   Specification of Letters Patent.   Patented Jan. 3, 1922.

Application filed January 21, 1921. Serial No. 438,810.

*To all whom it may concern:*

Be it known that I, WALTER A. HOFFMAN, a citizen of the United States, residing at New York, in the county of Bronx and State of New York, have invented certain new and useful Improvements in Calipers, of which the following is a full, clear, and exact specification.

This invention relates to calipers and has for its object to provide an instrument of this kind which is simple in construction, easy to adjust and accurate in its measurements. Another object is to provide the calipers with adjustable fingers or points adapted to take either external or internal measurements. Other objects will appear as the description proceeds.

The invention will be first hereinafter described in connection with the accompanying drawings, which constitute part of this invention, and then more specifically defined in the claims at the end of the description.

In the accompanying drawings, wherein similar reference characters are used to define corresponding parts throughout the several views:

Figure 5 is a front elevation of a modified form of calipers.

Figure 6 is a broken side view with the fingers or points removed and showing the set screw for locking the dove-tailed members in adjusted position.

Figures 7 and 8 are detailed perspective views of said dove-tailed members, and

Figures 9, 10 and 11 are detailed views of modified forms of fingers or points.

Figure 1:
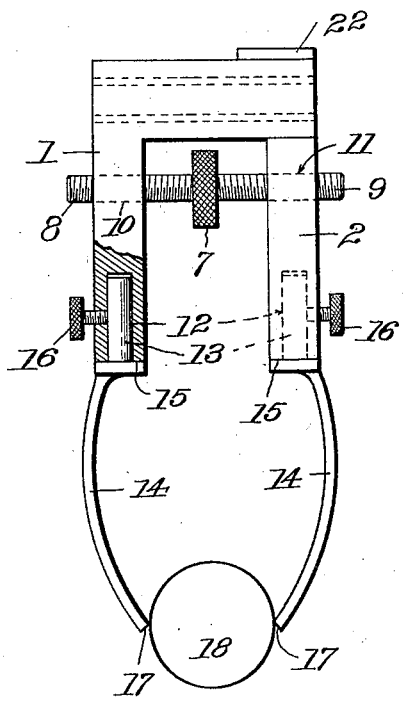
Figure 1 is a front elevation of a pair of calipers constructed substantially in accordance with my invention and adjusted to take the external measurement of a piece of work.

The calipers consist of two members 1 and 2 each having an angularly extending head portion 3 and 4, respectively, having sliding dove-tailed connections 5 and 6 whereby the members 1 and 2 may be adjusted in parallel relation at different distances apart. The adjustment of said members may be effected in any suitable manner as by the right and left hand screw, shown in Figures 1 and 2, or the uniformly threaded screw 24, shown in Figure 5. The adjusting screw, illustrated in Figure 1, has a milled head 7 arranged between the members 1 and 2, and oppositely threaded end portions 8 and 9 engaging correspondingly threaded passages 10 and 11 in said members 1 and 2, so that by rotating the head 7 in one direction the arms or members 1 and 2 will be drawn together, while rotation of said head in the opposite direction will move said arms away from each other.

In the form shown in Figure 5 the screw 24 is fastened to the arm 1 by a cross pin 25, and a milled nut 26 is fitted on the screw to engage the outer face of the arm 2. In this construction, a set screw 27 is provided on the head member 3 to clamp against the dove-tailed tongue 6 on the head member 4 for locking the arms 1 and 2 in adjusted positions.

Figure 2:
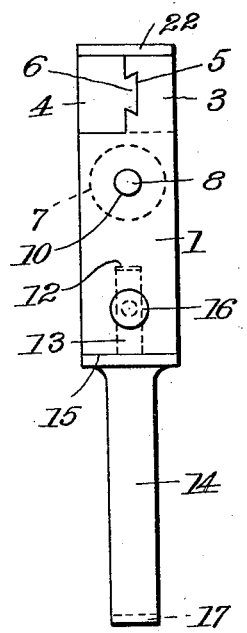
Figure 2 is an edge view of the calipers as shown in Figure 1.
Figure 3:
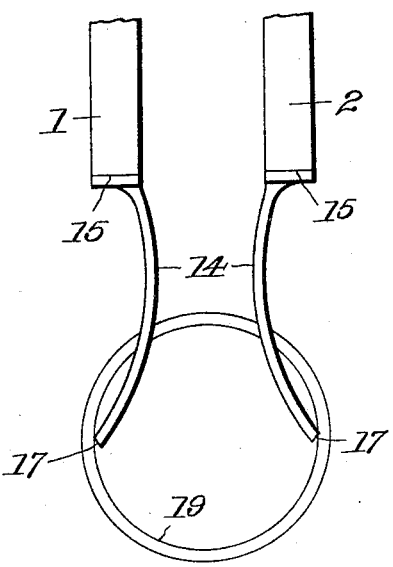
Figure 3 is a detail view of the lower portions of the calipers showing the fingers or points adjusted for taking the internal measurement of a tubular piece of work.

Sockets 12 are formed in the lower ends of the arms 1 and 2 to receive cylindrical lugs 13 on detachable and adjustable fingers or points 14. Said fingers or points depend from plates 15 at the bases of said cylindrical lugs 13 and when said lugs are inserted into the sockets 12 said plates 15 abut against the lower ends of the arms 1 and 2. While the fingers or points 14 are preferably bowed, as illustrated in Figures 1, 3 and 5, they may be formed, as shown in Figures 10 and 11 with substantially straight portions 29 and curved tips 30. The cylindrical lugs 13 are retained in the sockets 12 by set screws 16, and when said set screws are loosened the fingers or points may be rotated so as to adjust them for taking either external or internal measurements, see Figures 1 and 3.

The tips of the fingers or arms 14 may be broad and beveled off, as at 17 in Figures 1, 2, 3 and 5, or they may be pointed, as at 28 in Figure 9. The ends of the tips of the fingers should be arranged in vertical alignment with the inner or outer faces of the arms 1 and 2 in their different adjustments. The position of the cylindrical lugs 13 may be changed, as suggested in Figure 10, if the point of the tip is maintained in alignment with the face of the arm to which the finger is attached.

Figure 4:
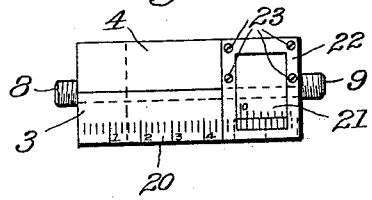
Figure 4 is a plan view of the calipers as shown in Figures 1 and 2.

The upper edge of the head member 3 may be provided with a scale 20 for measuring the distance between the arms 1 and 2 when the latter are adjusted for measuring the external diameter of a piece of work, as that shown at 18 in Figure 1, or the internal diameter of a tubular article 19, as shown in Figure 3. A vernier 22 is also preferably fastened to the head member 4 as by screws 23, Figure 4, said vernier carrying another scale 21 to co-operate with the scale 20 on the head member 3 for taking closer measurements.

I claim:

1. In calipers, the combination with parallel arms each having a head extending at an angle thereto, the heads being connected to slide on one another, of a double screw having a head arranged between said arms and oppositely threaded end portions engaging said arms for adjusting the latter, fingers depending from said arms, and means on said heads for measuring the distance between the tips of the fingers.

2. In calipers, the combination with parallel arms each having a head extending at an angle thereto, said heads being provided with dove-tailed connection, of means for adjusting said arms, fingers carried by the arms, and means on the heads for measuring the distance between the tips of the fingers.

3. In calipers, the combination with parallel arms each having a head extending at an angle thereto, said heads being provided with interlocking sliding connections, of a set screw extending through one of said heads and adapted to clamp upon the other head for locking said heads together at different adjustments of the arms, fingers carried by the arms and adapted to engage the work, and means on the heads for measuring the distance between the tips of the fingers.

In testimony whereof I have signed my name to this specification.

WALTER A. HOFFMAN.